(12) United States Patent
Takachi et al.

(10) Patent No.: US 10,604,212 B2
(45) Date of Patent: *Mar. 31, 2020

(54) BICYCLE REAR DERAILLEUR WITH A MOTION RESISTING STRUCTURE

(71) Applicant: Shimano, Inc., Sakai-ku, Sakai, Osaka (JP)

(72) Inventors: Takeshi Takachi, Kawachinagano (JP); Atsushi Iizuka, Osaka (JP); Nobukatsu Hara, Hannan (JP)

(73) Assignee: Shimano Inc., Sakai, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/392,072

(22) Filed: Apr. 23, 2019

(65) Prior Publication Data

US 2019/0248447 A1   Aug. 15, 2019

Related U.S. Application Data

(62) Division of application No. 15/189,597, filed on Jun. 22, 2016, now Pat. No. 10,315,728, which is a
(Continued)

(30) Foreign Application Priority Data

Aug. 24, 2007 (DE) .................. 10 2007 040 156

(51) Int. Cl.
*B62M 9/16* (2006.01)
*B62M 9/1248* (2010.01)
(Continued)

(52) U.S. Cl.
CPC .............. *B62M 9/16* (2013.01); *B62M 9/121* (2013.01); *B62M 9/1248* (2013.01); *B62M 2009/007* (2013.01); *B62M 2009/12406* (2013.01)

(58) Field of Classification Search
CPC ...... B62M 9/16; B62M 9/1248; B62M 9/121; B62M 2009/12406; B62M 2009/007
(Continued)

(56) References Cited

U.S. PATENT DOCUMENTS 75,227 A    3/1868  Weston
1,748,237 A  2/1930  Martin
(Continued)

FOREIGN PATENT DOCUMENTS

DE      29500597.1 U1    4/1995
DE      20009895 U1     12/2000
(Continued)

OTHER PUBLICATIONS

Niemann, G. and Winter, H., "Maschinen-elemente Band III," 1983, pp. 274-277, published in Germany.
(Continued)

*Primary Examiner* — Michael R Mansen
*Assistant Examiner* — Juan J Campos, Jr.
(74) *Attorney, Agent, or Firm* — Alleman Hall Creasman & Tuttle LLP

(57) ABSTRACT

A bicycle derailleur comprises a base member adapted to be mounted to a bicycle; a movable member movably coupled to the base member; a chain guide coupled to the movable member through a pivot shaft for rotating around an axis (X); a spring mounted around the axis (X), wherein the spring is configured to bias the chain guide in a selected rotational direction; and a resistance applying unit disposed on the pivot shaft. The resistance applying unit includes a friction unit, a one-way transmission unit, and an adjusting unit. The friction unit includes a plurality of first engaging members and at least one second engaging member, wherein the plurality of first engaging members are axially slidable with respect to the pivot shaft. The adjusting unit adjusts an
(Continued)

amount of friction between the plurality of first engaging members and the at least one second engaging member.

25 Claims, 7 Drawing Sheets

Related U.S. Application Data division of application No. 12/193,184, filed on Aug. 18, 2008, now Pat. No. 9,845,134.

(51) Int. Cl.
 *B62M 9/121* (2010.01)
 *B62M 9/00* (2006.01)
 *B62M 9/124* (2010.01)
(58) Field of Classification Search
 USPC .............................. 474/80, 82; 188/71.5, 26
 See application file for complete search history.

(56) References Cited

U.S. PATENT DOCUMENTS

| 4,392,840 | A | 7/1983 | Radocaj |
| 4,406,643 | A | 9/1983 | Shimano |
| 4,530,677 | A | 7/1985 | Nagano |
| 5,551,534 | A | 9/1996 | Smithberger et al. |
| 5,662,197 | A | 9/1997 | Tabe |
| 5,860,880 | A | 1/1999 | Oka |
| 6,135,904 | A | 10/2000 | Guthrie |
| 6,394,921 | B1 | 5/2002 | Fukuda |
| 6,561,334 | B2 | 5/2003 | Stark |
| 6,902,504 | B2 | 6/2005 | Fukuda |
| 2007/0219029 | A1 | 9/2007 | Turner |
| 2008/0058136 | A1* | 3/2008 | Muramoto ............ B62M 9/126 474/82 |
| 2009/0054183 | A1 | 2/2009 | Takachi et al. |
| 2009/0291789 | A1 | 11/2009 | Ishikawa et al. |

FOREIGN PATENT DOCUMENTS

| DE | 69721453 T2 | 4/2004 |
| DE | 102005057299 A1 | 6/2007 |
| DE | 102007006517 A1 | 8/2007 |
| DE | 102007040156 A1 | 2/2009 |
| EP | 0031215 A2 | 7/1981 |
| EP | 0791534 A2 | 8/1997 |
| EP | 1415902 A2 | 5/2004 |
| GB | 264964 | 2/1927 |
| GB | 376086 | 7/1932 |

OTHER PUBLICATIONS

Ina-Schaeffler KG, "Hulsenfreilaufe," Feb. 2004, pp. 1-24, published in Germany.
German search report dated Oct. 17, 2008 for DE 102007040156.8, the German patent application that corresponds to U.S. Appl. No. 12/193,184, now U.S. Pat. No. 9,845,134, which is the grandparent of this application.

* cited by examiner

BICYCLE REAR DERAILLEUR WITH A MOTION RESISTING STRUCTURE

CROSS REFERENCE TO RELATED APPLICATIONS

This application is a division of U.S. patent application Ser. No. 15/189,597 filed Jun. 22, 2016 and titled "Bicycle Rear Derailleur With a Motion Resisting Structure," which is a division of U.S. patent application Ser. No. 12/193,184 filed Aug. 18, 2008 and titled "Bicycle Rear Derailleur With a Motion Resisting Structure."

BACKGROUND OF THE INVENTION

The present invention is directed to bicycle derailleurs and, more particularly, to a bicycle derailleur with a motion resisting structure.

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

Typically, a rear derailleur comprises a base member, a movable member movably coupled to the base member via a linkage assembly, and a chain guide movably coupled to the movable member. The base member is attached to the frame of the bicycle, and the chain guide is configured to move a chain laterally over a plurality of rear sprockets. A torsion spring biases the chain guide in a chain tensioning direction around an axle housed in the movable member so that the chain guide can apply a sufficient tension to the chain. Another spring, called a return spring, biases the movable member and the chain guide to an innermost or outermost position relative to the rear sprockets. A Bowden-type control cable is typically coupled to the rear derailleur and to a conventional shift control device so that the rider may control the lateral movement of the chain guide. Pulling an inner wire of the control cable moves the chain guide against the biasing force of the return spring, while releasing the inner wire allows the chain guide to move in accordance with the biasing force of the return spring.

When riding on rough terrain, the chain guide sometimes swings both in the chain tensioning direction and in the direction opposite to the chain tensioning direction, thereby causing the chain to bounce severely. Such bouncing of the chain sometimes causes the chain to derail from the currently engaged front and/or rear sprocket.

SUMMARY OF THE INVENTION

The present invention is directed to various features of a bicycle derailleur. In one embodiment, a bicycle derailleur comprises a base member adapted to be mounted to a bicycle; a movable member movably coupled to the base member; a chain guide coupled to the movable member through a pivot shaft for rotating around an axis (X); a spring mounted around the axis (X), wherein the spring is configured to bias the chain guide in a selected rotational direction; and a resistance applying unit disposed on the pivot shaft. The resistance applying unit includes a friction unit, a one-way transmission unit, and an adjusting unit. The friction unit includes a plurality of first engaging members and at least one second engaging member, wherein the plurality of first engaging members are axially slidable with respect to the pivot shaft. The adjusting unit adjusts an amount of friction between the plurality of first engaging members and the at least one second engaging member.

In another embodiment, a bicycle derailleur comprises a base member adapted to be mounted to a bicycle, a movable member movably coupled to the base member, and a chain guide coupled to the movable member through a pivot shaft for rotating around an axis (X). The pivot shaft includes a first portion and a second portion that is located closer to the chain guide than the first portion. A spring is disposed on the second portion of the pivot shaft, wherein the spring is configured to bias the chain guide in a selected rotational direction. A resistance applying unit applies a resistance to pivotal movement of the chain guide in a rotational direction opposite to the selected rotational direction, wherein the resistance applying unit includes a friction unit and an adjusting unit disposed on the first portion of the pivot shaft to adjust a biasing force applied to the friction unit.

In another embodiment, a bicycle derailleur comprises a base member adapted to be mounted to a bicycle; a movable member movably coupled to the base member; a chain guide coupled to the movable member through a pivot shaft for rotating around an axis (X); and a spring mounted around the pivot shaft, wherein the spring is configured to bias the chain guide in a selected rotational direction. A resistance applying unit applies a resistance to pivotal movement of the chain guide in a direction opposite to the selected rotational direction, wherein the resistance applying unit includes a friction unit, a one-way transmission unit, and an adjusting unit disposed on the pivot shaft at a position farther from the chain guide than the spring in an axial direction with respect to the axis (X). The friction unit includes at least one first engaging member axially slidably attached to the pivot shaft and at least one second engaging member.

Additional inventive features will become apparent from the description below, and such features alone or in combination with the above features and their equivalents may form the basis of further inventions as recited in the claims.

DETAILED DESCRIPTION OF THE EMBODIMENTS

Figure 1:
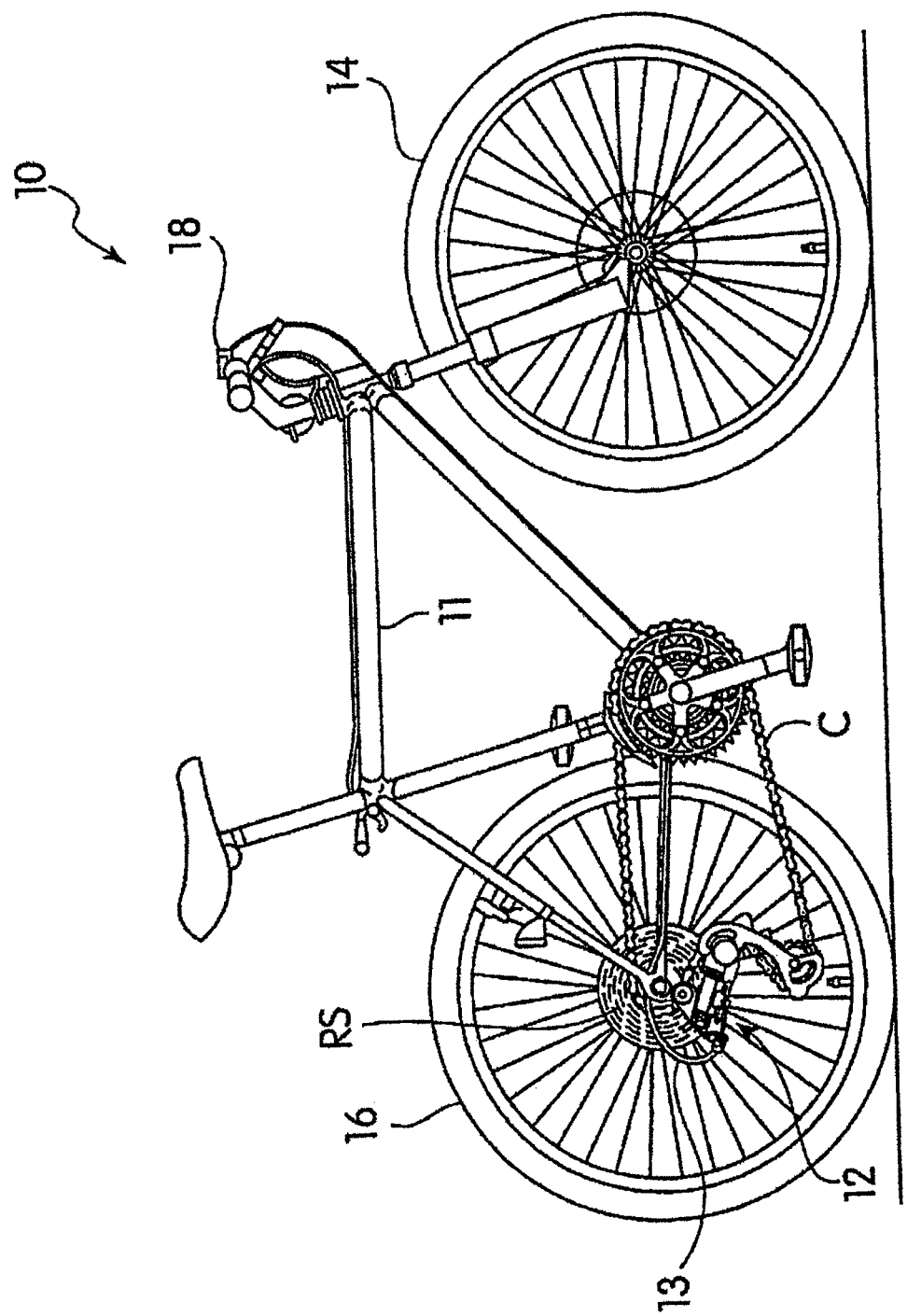
FIG. 1 is a side view of a bicycle that employs an embodiment of a rear derailleur.
Figure 2:
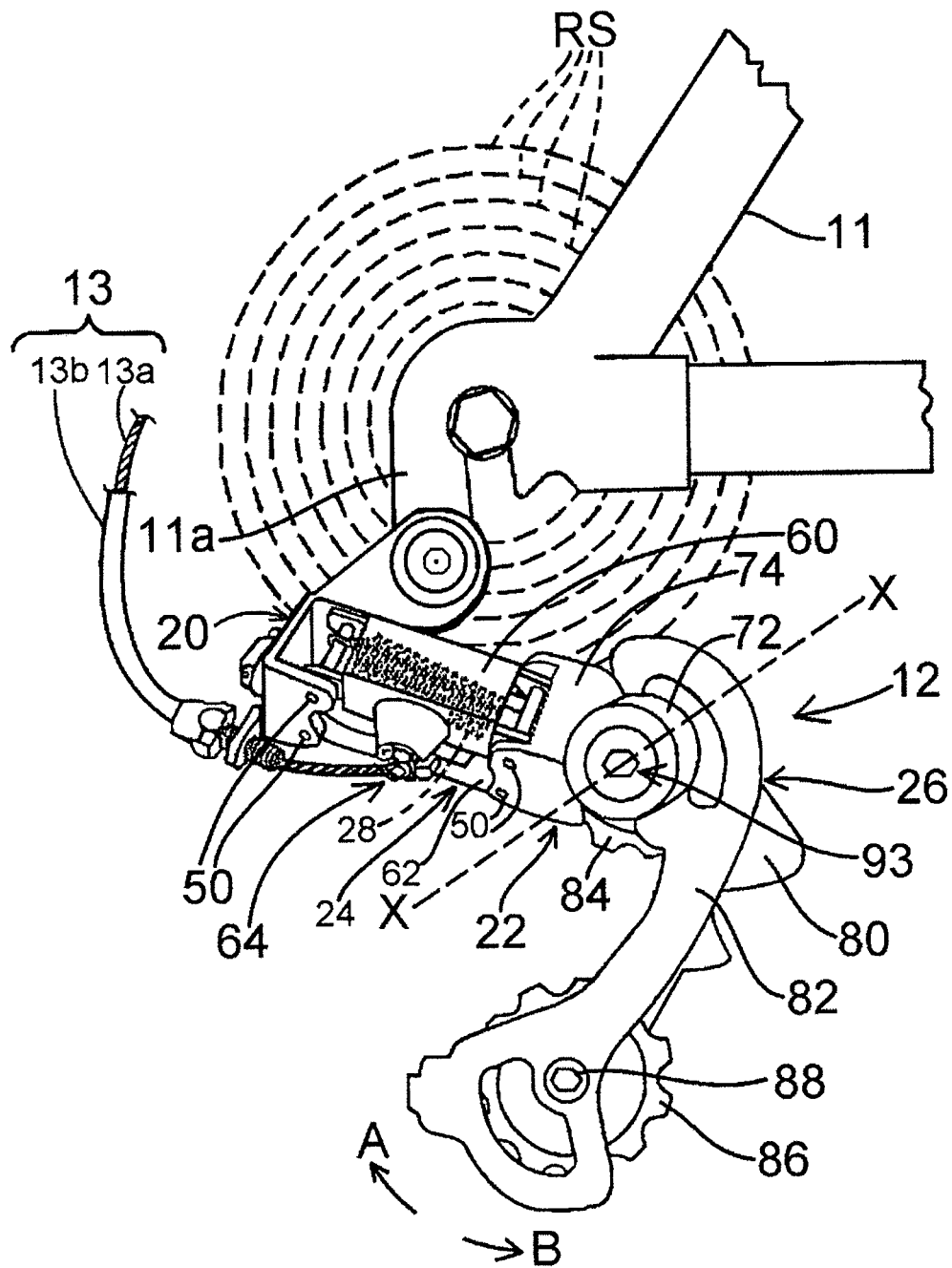
FIG. 2 is a more detailed view of the rear derailleur.

FIGS. 1 and 2 show a bicycle 10 equipped with a particular embodiment of a rear derailleur 12. Bicycle 10 is a conventional bicycle except for rear derailleur 12, so only rear derailleur 12 will be discussed in detail herein.

Bicycle 10 comprises a frame 11 with front and rear wheels 14 and 16 rotatably coupled to frame 11 in a conventional manner. The rear of frame 11 includes a rear derailleur mounting plate 11a, and rear derailleur 12 is directly attached to rear derailleur mounting plate 11a. Of course, many different rear derailleur mounting structures can be provided, such as a removable type derailleur hanger (not shown). Bicycle 10 further includes a conventional rear shift control device 18 mounted on a handlebar to control rear derailleur 12 via a Bowden-type shift control cable 13 that includes an inner wire 13a slidably disposed within an outer casing 13b. The rider operates shift control device 18 to selectively pull or release inner wire 13a to operate rear derailleur 12 to move a chain C laterally over a plurality of rear sprockets RS that are coupled to rear wheel 16.

As shown in FIG. 2, rear derailleur 12 comprises a base member 20, a movable member 22, a linkage assembly 24, and a chain guide 26. Base member 20 is structured to be mounted to rear derailleur mounting plate 11a, and linkage assembly 24 is coupled between base member 20 and movable member 22 so that chain guide 26 can move to a plurality of shift positions corresponding to the number of rear sprockets RS. A return spring 28 biases chain guide 26 either laterally inwardly or laterally outwardly relative to the plurality of rear sprockets RS, depending upon the application. In this embodiment, return spring 28 biases chain guide 26 laterally outwardly.

Linkage assembly 24 includes a pair of parallel links 60 and 62. Link 60 is an upper/outer link, while link 62 is a lower/inner link. Links 60 and 62 are pivotally coupled to base member 20 and to movable member 22 through four pivot pins 50. The ends of return spring 28 are mounted on diagonally opposed pivot pins 50 to bias movable member 22 and chain guide 26 laterally outwardly toward the smallest rear sprocket. A cable attachment device 64 extends from a lower side of link 60 for the attachment of inner wire 13a.

Figure 3:
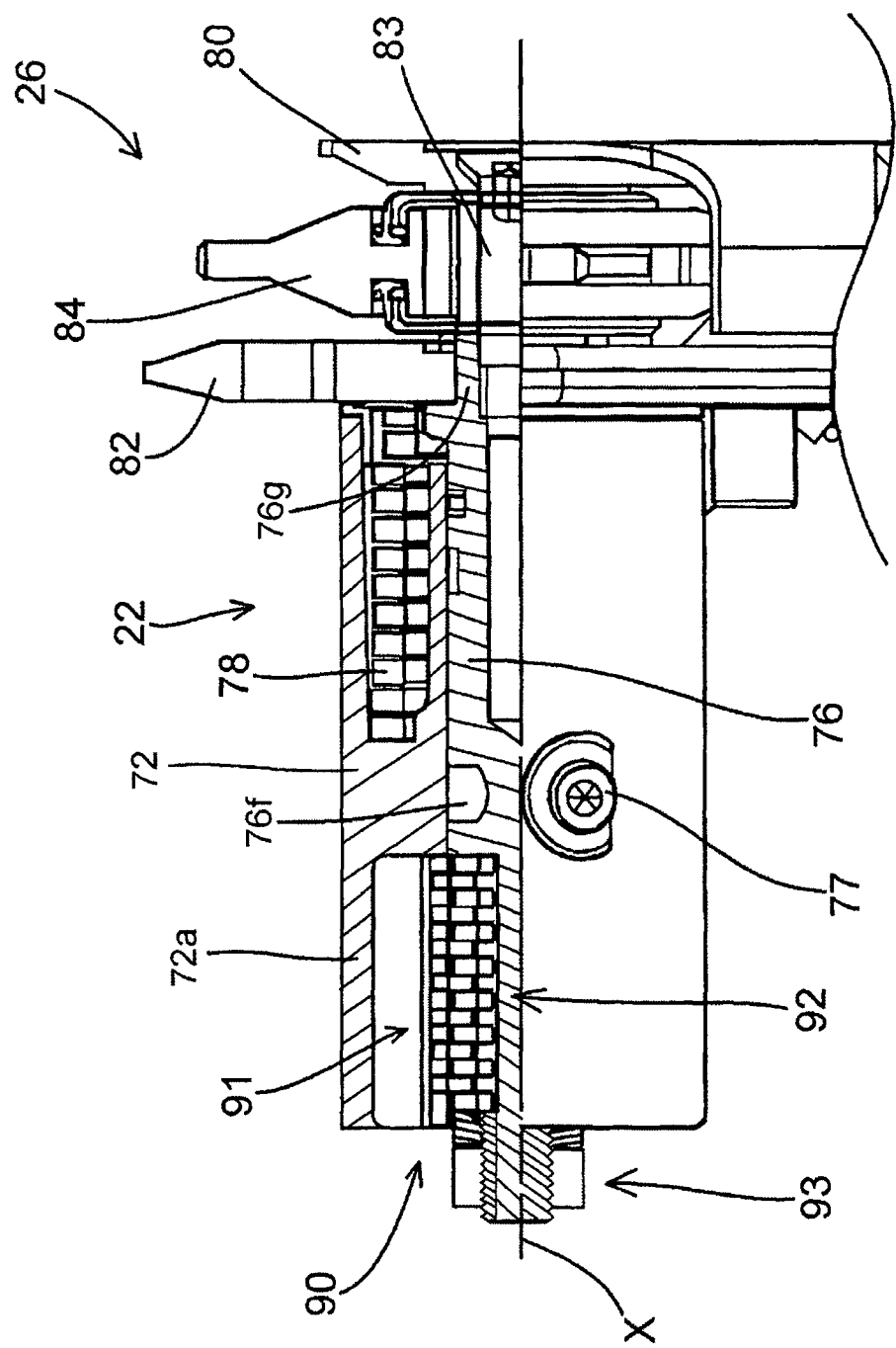
FIG. 3 is a partial cross-sectional view of a movable member that includes a particular embodiment of a motion resisting structure.

As shown in FIGS. 2 and 3, movable member 22 comprises a tubular housing 72 and a link attachment portion 74. Housing 72 is fixedly attached to (e.g., integrally formed with) link attachment portion 74 and houses a portion of a resistance applying unit 90 that is discussed in further detail below.

Figure 5:
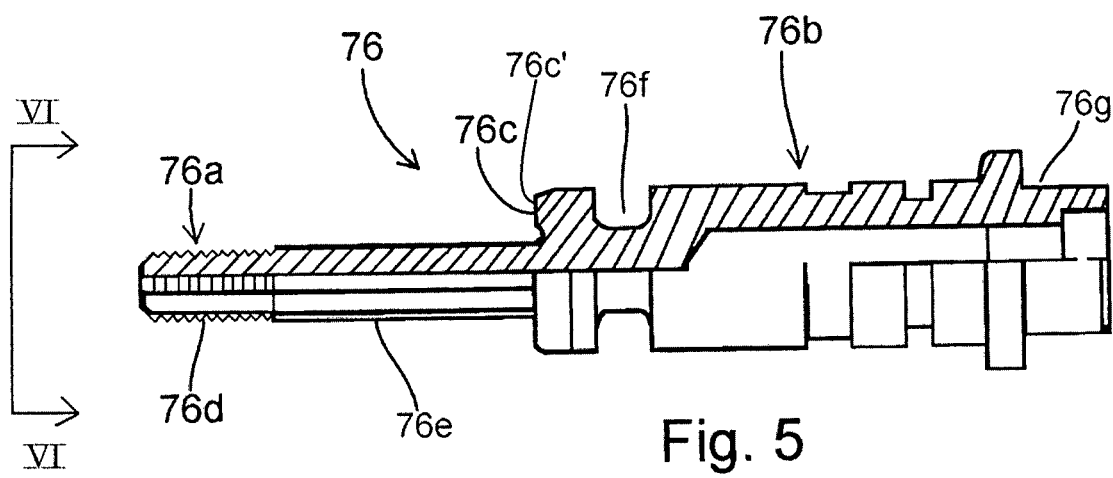
FIG. 5 is a partial cross-sectional view of a particular embodiment of a pivot shaft used in the derailleur.
Figure 6:
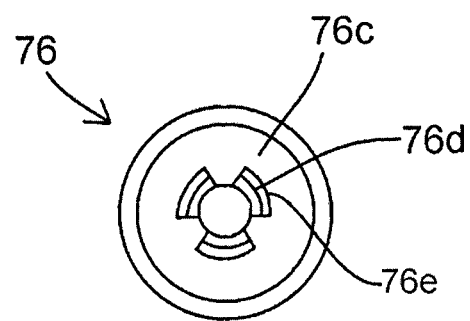
FIG. 6 is a view taken along line VI-VI in FIG. 5.

A pivot shaft 76 is disposed within housing 72. As shown in FIGS. 3 and 5, pivot shaft 76 includes a first portion 76a and a second portion 76b, wherein first portion 76a has a smaller diameter than second portion 76b so that a step 76c having a step surface 76c' is formed between first portion 76a and second portion 76b. When rear derailleur 12 is attached to bicycle 10, first portion 76a is arranged laterally outwardly of second portion 76b. An external thread 76d is disposed on the free end of first portion 76a, and a coupling structure 76e in the form of a plurality of splines is disposed on first portion 76a between external thread 76d and step 76c. FIG. 6 shows the structure of external thread 76d and coupling structure 76e in more detail. A circumferential groove 76f is disposed on second portion 76b. A screw 77 (FIG. 3) engages groove 76f to prevent axial movement of pivot shaft 76 while allowing pivot shaft 76 to rotate around a rotational axis X. An end portion 76g of pivot shaft 76 is press-fitted to an outer plate 82 of chain guide 26 so that chain guide 26 also rotates around axis X. A spring 78 is mounted around pivot shaft 76 within housing 72. In this embodiment, spring 78 is a torsion spring with one end coupled to housing 72 and the other end coupled to outer plate 82 of chain guide 26 to bias chain guide 26 in a selected rotational direction such as chain tensioning direction A shown in FIG. 2.

As shown in FIGS. 2 and 3, chain guide 26 comprises an inner plate 80, the outer plate 82, a guide pulley 84 and a tension pulley 86. A fixing bolt 83 screws into an inner bore of pivot shaft 76 to couple inner plate 80, outer plate 82 and guide pulley 84 to pivot shaft 76. Guide pulley 84 is rotatably supported by fixing bolt 83 and rotates around pivot axis X. A mounting screw 88 couples inner plate 80, outer plate 82 and tension pulley 86 together so that tension pulley 86 is rotatably supported by mounting screw 88.

Figure 4:
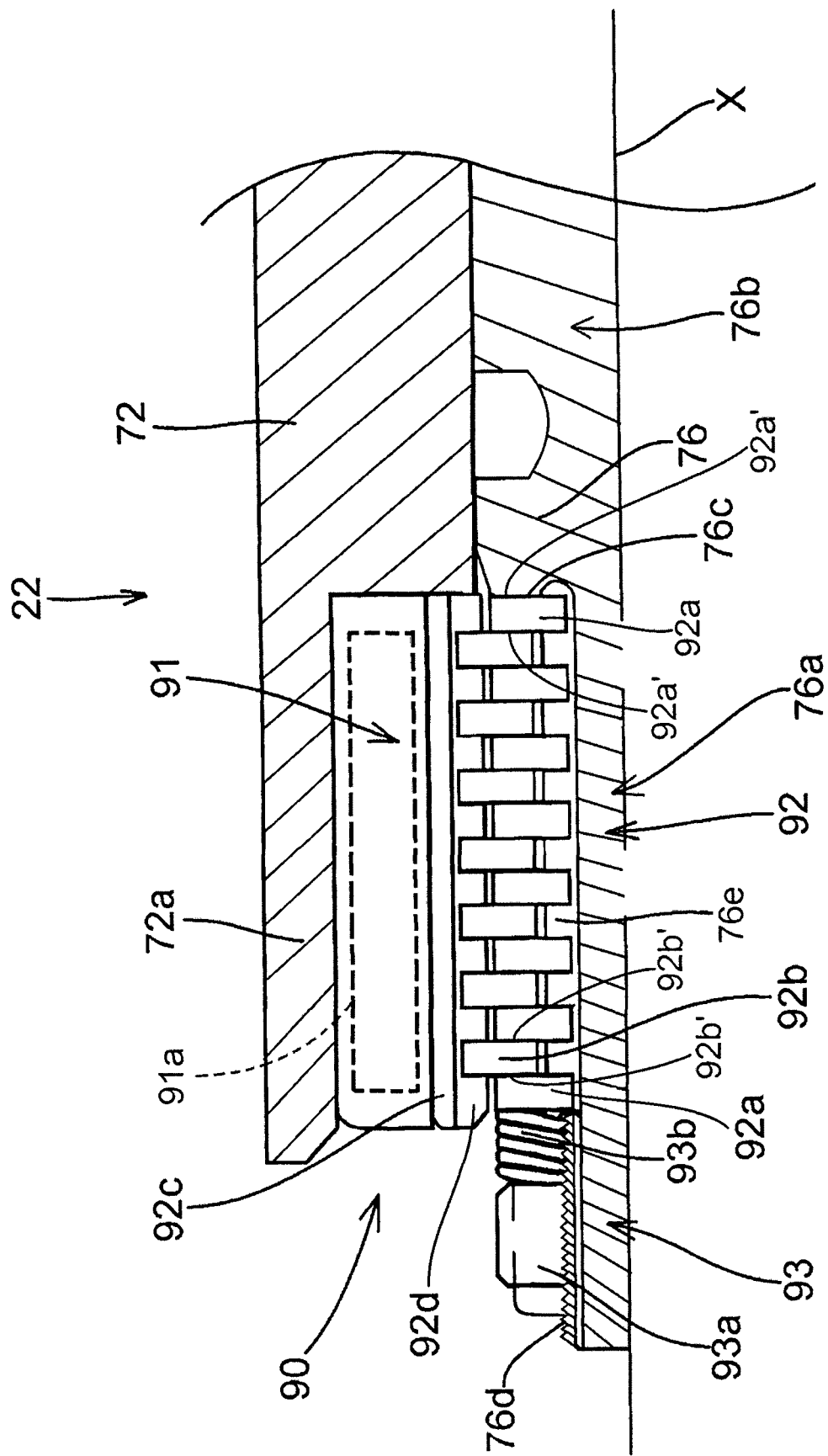
FIG. 4 is a more detailed view of the motion resisting structure.

Resistance applying unit 90 applies a resistance to pivotal movement of chain guide 26 in a rotational direction B (FIG. 2) opposite the chain tensioning direction A. As shown in FIGS. 3 and 4, resistance applying unit 90 in this embodiment comprises a friction unit 92, a one-way transmission unit 91 and an adjusting unit 93. Friction unit 92 comprises at least one first engaging member in the form of a first engaging plate 92a having frictional contact areas 92a', for example, at least one second engaging member in the form of a second engaging plate 92b having frictional contact areas 92b', for example, and a tubular intermediate retaining member 92c. In this embodiment, friction unit 92 comprises a plurality of (e.g., eight) first engaging plates 92a and a plurality of (e.g., seven) second engaging plates 92b, wherein each first engaging plate 92a and each second engaging plate 92b comprises a friction plate.

Figure 8:
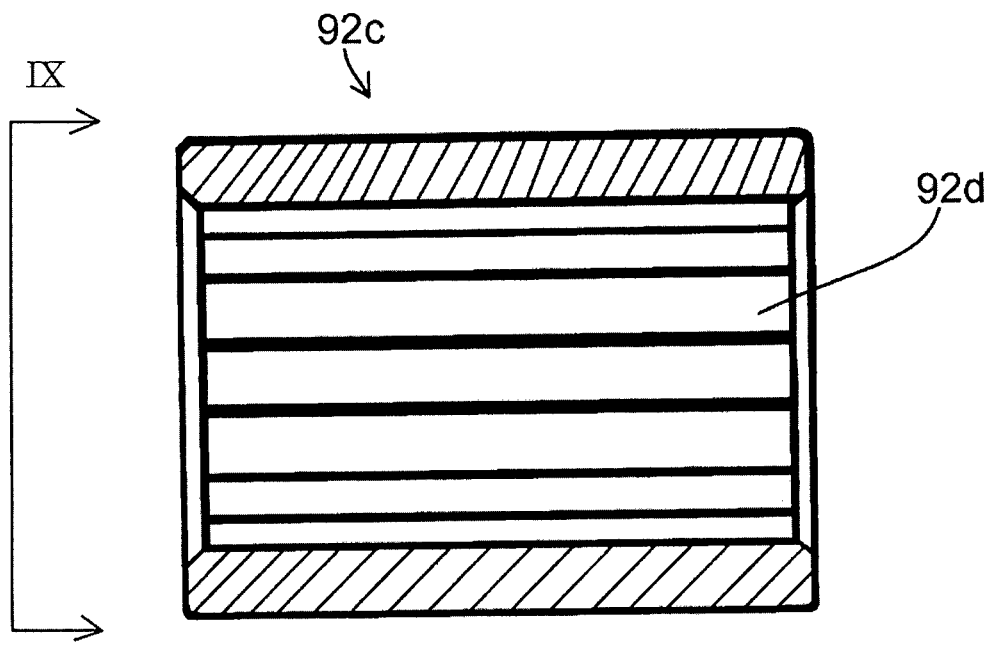
FIG. 8 is a cross sectional view of a particular embodiment of a tubular intermediate retaining member.
Figure 9:
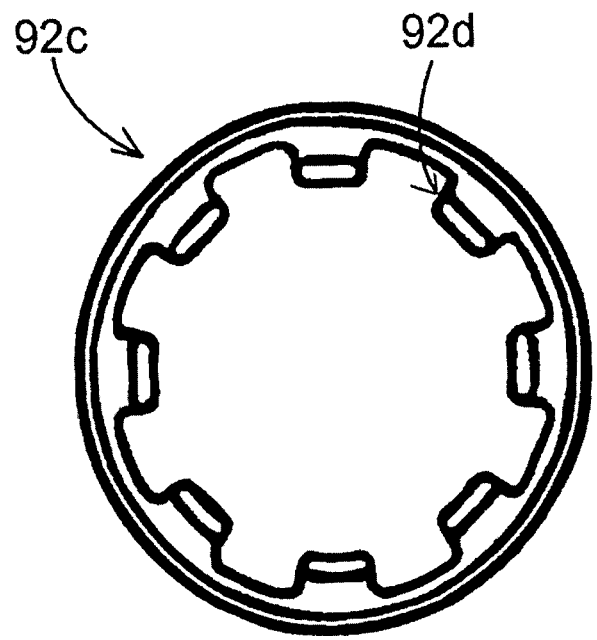
FIG. 9 is a view taken along line IX-IX in FIG. 9.

As shown in FIGS. 8 and 9, intermediate retaining member 92c surrounds coupling structure 76e of pivot shaft 76 and is housed within a tubular end wall 72a of housing 72. A coupling structure 92d in the form of a plurality of radially inwardly extending splines, for example, is formed on the inner peripheral surface of intermediate retaining member 92c.

Figure 7:
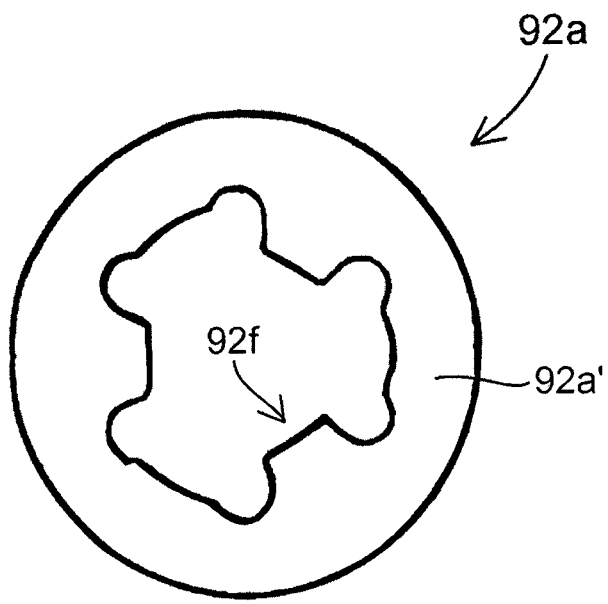
FIG. 7 is a side view of a particular embodiment of a first engaging plate.

As shown in FIG. 7, first engaging plate 92a is a ring-shaped member having a coupling structure 92f in the form of a plurality of radially inwardly extending splines, for example. Coupling structure 92f is dimensioned to engage coupling structure 76e on pivot shaft 76, so that pivot shaft 76 functions as a retaining member for first engaging plate 92a. As a result, the plurality of first engaging plates 92a are non-rotatably but axially slidably attached to pivot shaft 76.

Figure 10:
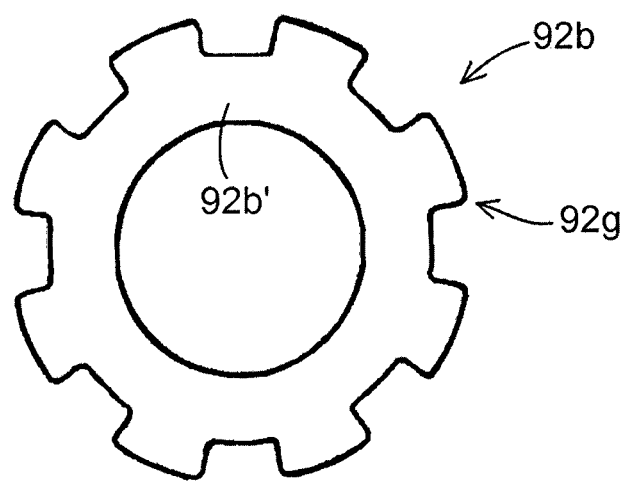
FIG. 10 is a side view of a particular embodiment of a second engaging plate.

As shown in FIG. 10, second engaging plate 92b is a ring-shaped member having a coupling structure 92g in the form of a plurality of radially outwardly extending splines, for example. Coupling structure 92g is dimensioned to engage coupling structure in 92d on intermediate retaining member 92c. As a result, the plurality of second engaging plates 92b are non-rotatably but axially slidably attached to intermediate retaining member 92c.

As shown in FIG. 4, the plurality of first engaging plates 92a alternate with the plurality of second engaging plates 92b so that the inner portions of the plurality of second engaging plates 92b contact the outer portions of the plurality of first engaging plates 92a. As a result, the first and second engaging plates 92a and 92b operatively couple pivot shaft 76 to intermediate retaining member 92c. In this embodiment, the contact area between each first and second engaging plate 92a and 92b is relatively small. However, providing a plurality of first and second engaging plates 92a and 92b allows the total contact area between the first and second engaging plates 92a and 92b to be effectively increased without increasing a radial dimension of housing 72. As a result, movable member 22 in particular and rear derailleur 12 in general can be made more compact. The plurality of first engaging plates 92a and the plurality of second engaging plates 92b can be made of any suitable material that provides the desired amount of friction therebetween. In this embodiment, the first and second engaging plates 92a and 92b comprise an aluminum alloy.

Adjusting unit 93 is disposed on (e.g., around) pivot shaft 76 and is provided to adjust the biasing force applied to friction unit 92. As shown in FIG. 4, adjusting unit 93 comprises an adjusting element 93a and a biasing element 93b. Adjusting element 93a may have the form of an adjusting nut that is screwed onto external thread 76d of pivot shaft 76, and biasing element 93b may have the form of a spring 93b disposed between adjusting element 93a and friction unit 92. In this embodiment, biasing element 93b provides a biasing force against the outermost first engaging plate 92a of the friction unit 92. Consequently, turning adjusting element 93a moves adjusting element 93a in the direction of rotational axis X to increase or decrease the biasing force of biasing element 93b, thereby adjusting the amount of friction between the plurality of first engaging plates 92a and the plurality of second engaging plates 92b. In this embodiment, the frictional force is increased by moving adjusting element 93a inwardly (i.e. toward bicycle 10), while the frictional force is decreased by moving adjusting element 93a outwardly (away from bicycle 10). Housing 72 of movable member 22 is configured to expose a portion of pivot shaft 76 and adjusting element 93a so that the rider can easily access adjusting element 93a.

As shown in FIG. 4, one-way transmission unit 91 is disposed between intermediate retaining member 92c and tubular end wall 72a of housing 72. In this embodiment, one-way transmission unit 91 comprises a roller clutch unit, the structure of which is well-known. By definition, such roller clutch units include at least one roller 91a, shown schematically in FIG. 4. More specifically, roller clutch units include a plurality of such rollers 91a arranged circumferentially around roller clutch 91. As a result, intermediate member 92c is disposed between roller 91a and pivot shaft 76. One-way transmission unit 91 is arranged such that rotational force in the chain tensioning direction A from intermediate retaining member 92c is not transmitted to tubular end wall 72a of housing 72. Thus, when chain guide 26 rotates in the chain tensioning direction A, pivot shaft 76 rotates freely in the chain tensioning direction A together with chain guide 26, and intermediate retaining member 92c rotates with pivot shaft 76 due to the frictional force of friction unit 92 without transmitting the rotational force to housing 72.

On the other hand, when chain guide 26 is subjected to a rotational force in the rotational direction B, the rotational force is communicated to pivot shaft 76 and to intermediate retaining member 92c through the plurality of first engaging plates 92a and the plurality of second engaging plates 92b. This time, the rotational force is communicated to housing 72 through one-way transmission unit 91. Since housing 72 is not rotatable, intermediate retaining member 92c cannot rotate in rotational direction B. As a result, chain guide 26 and pivot shaft 76 also do not rotate. However, if the force in the rotational direction B is sufficiently strong, then the rotational force will cause the plurality of first engaging plates 92a to slide relative to the plurality of second engaging plates 92b, but the friction between the plurality of first engaging plates 92a and the plurality of second engaging plates 92b continuously resists such movement, thereby damping the rotation of pivot shaft 76 and chain guide 26 in the rotational direction B. The degree of resistance is adjusted easily by moving adjusting element 93a depending on the rider's preference.

While the above is a description of various embodiments of inventive features, further modifications may be employed without departing from the spirit and scope of the present invention. For example, while a mechanical (i.e., cable actuated) rear derailleur was described, the teachings herein can be employed with other types of derailleurs such as pneumatic derailleurs, motorized/electrical derailleurs and/or electromechanical derailleurs. While a roller clutch was provided as an example of a one-way transmission unit, other types of one-way transmission units, such as a ratchet and pawl type one-way transmission unit, could be used. While the teachings herein were applied to the movable member of the derailleur, the teachings herein also could be applied to the base member of the derailleur or to some other structure that could prevent undesirable movement of the chain guide, in which case the rotational axis X would be located at that structure, and the chain guide would rotate around that rotational axis X accordingly.

The terms "part," "section," "portion," "member" or "element" when used in the singular can have the dual meaning of a single part or a plurality of parts. The terms "forward, rearward, above, downward, vertical, horizontal, below and transverse" as well as any other similar directional terms refer to of a bicycle equipped with the structures described herein in the normal upright riding position. The size, shape, location or orientation of the various components may be changed as desired. Components that are shown directly connected or contacting each other may have intermediate structures disposed between them. Separate components may be combined, and vice versa. The functions of one element may be performed by two, and vice versa. The function of one element may be performed by another, and functions may be interchanged among the elements. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Terms of degree such as "substantially," "about" and "approximately" as used herein include a reasonable amount of deviation of the modified term such that the end result is not significantly changed. For example, such terms may include a deviation of at least ±5% of the modified term as long as such a deviation would not negate the meaning of the word it modifies. Thus, the scope of the invention should not be limited by the specific structures disclosed or the apparent initial focus or emphasis on a particular structure or feature.

What is claimed is:

1. A bicycle derailleur comprising:
a base member adapted to be mounted to a bicycle;
a movable member movably coupled to the base member;
a chain guide coupled to the movable member through a pivot shaft for rotating around an axis (X);
a spring mounted around the axis (X), wherein the spring is configured to bias the chain guide in a selected rotational direction; and
a resistance applying unit disposed on the pivot shaft, wherein the resistance applying unit includes:
a friction unit including:
a plurality of first engaging members axially slidable with respect to the pivot shaft; and
at least one second engaging member;
a one-way transmission unit; and an adjusting unit that adjusts an amount of friction between the plurality of first engaging members and the at least one second engaging member.

2. The bicycle derailleur according to claim 1 wherein the adjusting unit comprises:
an adjusting element; and
a biasing element.

3. The bicycle derailleur according to claim 1 wherein an end portion of the pivot shaft is press-fitted to the chain guide.

4. The bicycle derailleur according to claim 1 wherein the chain guide comprises:
an inner plate;
an outer plate;
a guide pulley; and
a tension pulley.

5. The bicycle derailleur according to claim 4 wherein an end portion of the pivot shaft is press-fitted to the outer plate of the chain guide.

6. The bicycle derailleur according to claim 1 wherein at least one of the plurality of first engaging members is a ring-shaped member having a coupling structure that is dimensioned to engage a coupling structure of the pivot shaft.

7. The bicycle derailleur according to claim 1 wherein the pivot shaft functions as a retaining member for at least one of the plurality of first engaging members.

8. The bicycle derailleur according to claim 1 wherein the at least one second engaging member is a ring-shaped member having a coupling structure in the form of a plurality of radially outwardly extending splines.

9. A bicycle derailleur comprising:
a base member adapted to be mounted to a bicycle;
a movable member movably coupled to the base member;
a chain guide coupled to the movable member through a pivot shaft for rotating around an axis (X);
wherein the pivot shaft includes:
a first portion; and
a second portion that is located closer to the chain guide than the first portion;
a spring disposed on the second portion of the pivot shaft, wherein the spring is configured to bias the chain guide in a selected rotational direction; and
a resistance applying unit that applies a resistance to pivotal movement of the chain guide in a rotational direction opposite to the selected rotational direction, wherein the resistance applying unit includes:
a friction unit; and
an adjusting unit disposed on the first portion of the pivot shaft to adjust a biasing force applied to the friction unit.

10. The bicycle derailleur according to claim 9 wherein the adjusting unit comprises:
an adjusting element; and
a biasing element.

11. The bicycle derailleur according to claim 9 wherein an end portion of the pivot shaft is press-fitted to the chain guide.

12. The bicycle derailleur according to claim 9 wherein the chain guide comprises:
an inner plate;
an outer plate;
a guide pulley; and
a tension pulley.

13. The bicycle derailleur according to claim 12 wherein an end portion of the pivot shaft is press-fitted to the outer plate of the chain guide.

14. The bicycle derailleur according to claim 9 wherein the friction unit comprises:
a plurality of first engaging members axially slidable with respect to the pivot shaft; and
at least one second engaging member.

15. The bicycle derailleur according to claim 14 wherein at least one of the plurality of first engaging members is a ring-shaped member having a coupling structure that is dimensioned to engage a coupling structure of the pivot shaft.

16. The bicycle derailleur according to claim 14 wherein the pivot shaft functions as a retaining member for at least one of the plurality of first engaging members.

17. The bicycle derailleur according to claim 14 wherein the at least one second engaging member is a ring-shaped member having a coupling structure in the form of a plurality of radially outwardly extending splines.

18. A bicycle derailleur comprising:
a base member adapted to be mounted to a bicycle;
a movable member movably coupled to the base member;
a chain guide coupled to the movable member through a pivot shaft for rotating around an axis (X);
a spring mounted around the pivot shaft, wherein the spring is configured to bias the chain guide in a selected rotational direction; and
a resistance applying unit that applies a resistance to pivotal movement of the chain guide in a direction opposite to the selected rotational direction;
wherein the resistance applying unit includes:
a friction unit including:
at least one first engaging member axially slidably attached to the pivot shaft; and
at least one second engaging member;
a one-way transmission unit; and
an adjusting unit disposed on the pivot shaft at a position farther from the chain guide than the spring in an axial direction with respect to the axis (X).

19. The bicycle derailleur according to claim 18 wherein the adjusting unit comprises:
an adjusting element; and
a biasing element.

20. The bicycle derailleur according to claim 18 wherein an end portion of the pivot shaft is press-fitted to the chain guide.

21. The bicycle derailleur according to claim 18 wherein the chain guide comprises:
an inner plate;
an outer plate;
a guide pulley; and
a tension pulley.

22. The bicycle derailleur according to claim 21 wherein an end portion of the pivot shaft is press-fitted to the outer plate of the chain guide.

23. The bicycle derailleur according to claim 18 wherein the at least one first engaging member is a ring-shaped member having a coupling structure that is dimensioned to engage a coupling structure of the pivot shaft.

24. The bicycle derailleur according to claim 18 wherein the pivot shaft functions as a retaining member for the at least one first engaging member.

25. The bicycle derailleur according to claim 18 wherein the at least one second engaging member is a ring-shaped member having a coupling structure in the form of a plurality of radially outwardly extending splines.

* * * * *